(12) United States Patent
Fuse et al.

(10) Patent No.: US 7,869,600 B2
(45) Date of Patent: Jan. 11, 2011

(54) OPTICAL TRANSMITTER AND TRANSMITTING METHOD FOR TRANSMITTING CRYPTOGRAM

(75) Inventors: Masaru Fuse, Osaka (JP); Osamu Hirota, Kanagawa (JP); Masaki Souma, Tokyo (JP)

(73) Assignee: Panasonic Corporation, Osaka (JP)

( * ) Notice: Subject to any disclaimer, the term of this patent is extended or adjusted under 35 U.S.C. 154(b) by 789 days.

(21) Appl. No.: 11/886,256

(22) PCT Filed: Mar. 27, 2006

(86) PCT No.: PCT/JP2006/306132

§ 371 (c)(1),
(2), (4) Date: Sep. 13, 2007

(87) PCT Pub. No.: WO2006/104090

PCT Pub. Date: Oct. 5, 2006

(65) Prior Publication Data

US 2008/0095544 A1 Apr. 24, 2008

(30) Foreign Application Priority Data

Mar. 29, 2005 (JP) ............................. 2005-095412

(51) Int. Cl.
*H04N 7/167* (2006.01)
*H04L 9/00* (2006.01)
*H04K 1/00* (2006.01)

(52) U.S. Cl. .................. 380/256; 380/224; 380/239; 380/259; 380/268

(58) Field of Classification Search ............... 380/224, 380/239, 256, 259, 268
See application file for complete search history.

(56) References Cited

FOREIGN PATENT DOCUMENTS

JP 2005-057313 3/2005

OTHER PUBLICATIONS

International Search Report for PCT/JP2006/306132 mailed on Jun. 6, 2006.
O. Hirota et al., "Quantum Stream Cipher Based on Optical Communications", SPIE Proc. on Quantum Communication, vol. 5551, Jul. 8, 2004.
C. H. Bennett et al., "Quantum Cryptography", in Proc. IEEE, Int. Conf. on Computers, Systems and Signal Processing, p. 175-179, Dec. 10-12, 1984.
G. A. Barbosa et al., "Secure Communication Using Mesoscopic Coherent States", Phys. Rev. Lett., vol. 90, 227901, Jun. 6, 2003.

*Primary Examiner*—Nasser Moazzami
*Assistant Examiner*—Mohammad W Reza
(74) *Attorney, Agent, or Firm*—Wenderoth, Lind & Ponack, L.L.P.

(57) ABSTRACT

A dynamic range of intensity modulation is set to range from a maximum intensity Smax to a minimum intensity Smin. A difference $\Delta(=\text{Smax}-\text{Smin})$ between the maximum intensity Smax and the minimum intensity Smin is divided by the number 2M of multilevel signals. Thus, a distance (an intensity difference) between adjacent signals is $[\Delta/2M]$. The number 2M of multilevel signals is selected such that the distance $[\Delta/2M]$ between adjacent multilevel signals (between an intensity $S_i$ and an intensity $S_{i+1}$) is sufficiently buried within a range of quantum fluctuations obtained when heterodyne measurements are made or buried within a range of quantum shot noise obtained when a direct detection is made. Bases of a basis group are each positioned for intensity signals so as to have a high intensity and a low intensity between which a distance is set to be a certain value smaller than a middle point intensity $[\Delta/2]$. Note that adjacent bases are set to have an intensity signal transmitting a logical value "1" of transmission data and an intensity signal transmitting a logical value "0" of transmission data in an inverted manner.

6 Claims, 4 Drawing Sheets

F I G. 3
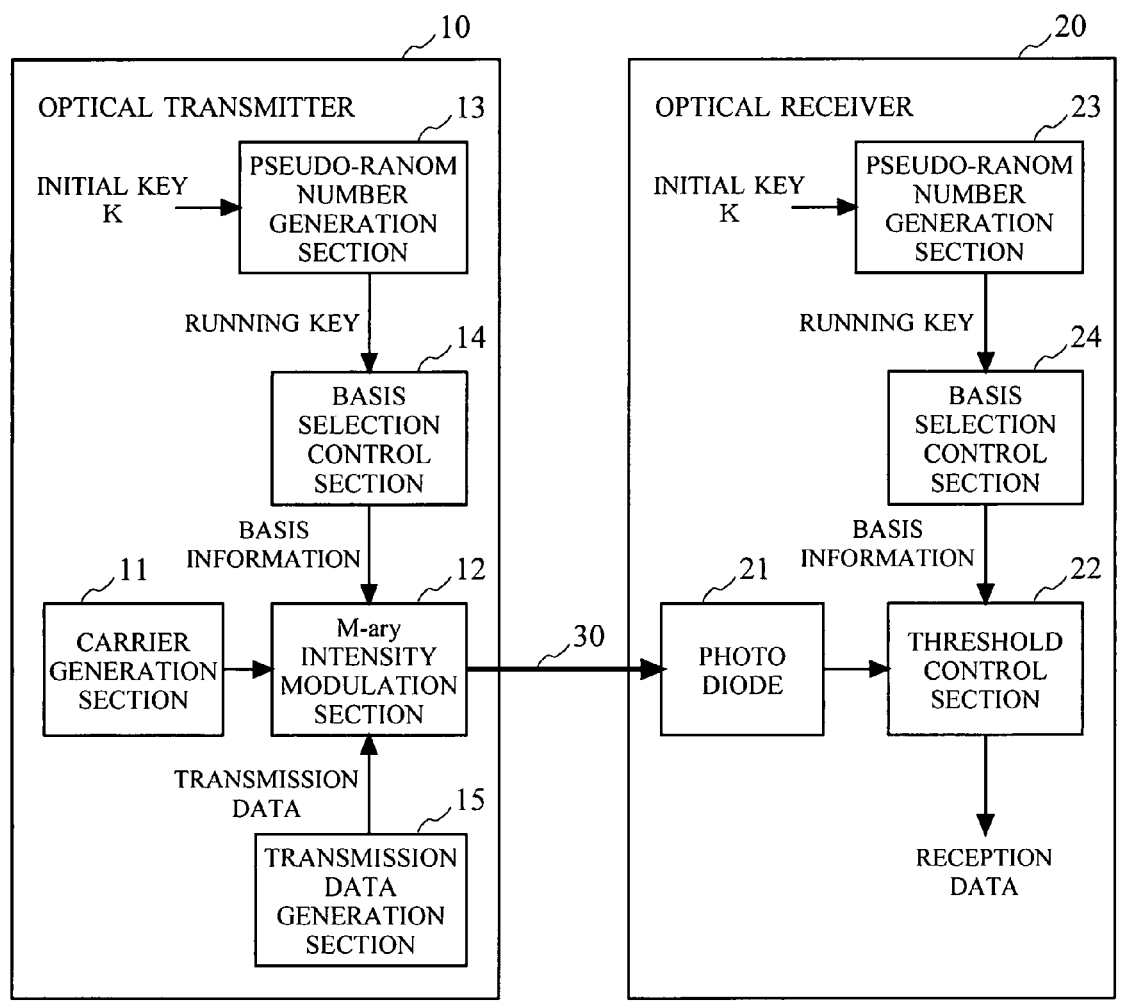

OPTICAL TRANSMITTER AND TRANSMITTING METHOD FOR TRANSMITTING CRYPTOGRAM

TECHNICAL FIELD

The present invention relates to an optical transmitter and an optical transmitting method for transmitting cryptogram, which are capable of utilizing ultimate security in cryptography using Yuen protocol and the like.

BACKGROUND ART

Leading cryptography of today, which bases its security on complexity theory or an amount of computation, develops significantly with mathematical science. On the other hand, there is a form which uses, during a communication process, principles of physics relating to physical phenomena of a signal system in order to guarantee its security, and therefore realizes an unbreakable cipher. The form is referred to as physical cryptography, which includes quantum cryptography of which developments have been advanced in recent years.

A quantum cryptography technique such as quantum cryptography using a secret key distribution protocol (BB-84) is disclosed in Non-patent Document 1. The quantum cryptography disclosed in Non-patent Document 1 is a technique which follows a principle that completely secure cryptographic communication is only possible by means of one time pad using a key of length greater than plaintext and which technique applies quantum communication so as to distribute a large number of keys required for the one time pad.

Additionally, another quantum cryptography technique such as common key quantum cryptography has been developed, which is so secure as to be expected to be utilized on the current optical networks and as to be declared to be unbreakable even by an infinite computational capability. The common key quantum cryptography is a technique which applies a new framework referred to as an M-ary quantum state modulation method and which allows an optical modulator/demodulator provided between legitimate sender and receiver to communicate M (M is a positive integer) quantum state signal bases by switching the M quantum state signal bases in accordance with a common pseudo-random number so as to directly communicate plaintext in cipher.

A quantum state signal basis as used herein refers to a pair of two quantum state signals which transmit information representing logical values "1" and "0". Hereinafter, the quantum state signal basis will be simply referred to as a "basis". For example, when coherent state signals in a 0 degree phase and in a 180 degree phase transmit information, a pair of two quantum state signals transmitting the information is a basis.

A cryptographic protocol based on the above-described idea is referred to as Yuen-2000 cryptographic communication protocol (abbreviated as Y-00 protocol). Presently, a communication method for realizing Y-00 protocol includes an optical phase modulation method disclosed in Non-patent Document 2 and an optical intensity modulation method disclosed in Non-patent Document 3. In each of the above methods, a basis group is arranged in accordance with a relational equation. In the optical phase modulation method, bases are positioned at positions which are provided on a phase plane by dividing circumference of amplitude A at regular intervals by the number of signals. In the optical intensity modulation method, bases are positioned at positions which are provided by dividing a difference between a maximum intensity and a minimum intensity equally by the number of signals and are also provided based on a middle point intensity of the maximum intensity and the minimum intensity.

With reference to FIG. 3, basic principles of a conventional cryptographic communication device using the optical intensity modulation method disclosed in Non-patent Document 3 will be described.

In FIG. 3, the conventional cryptographic communication device includes an optical transmitter 10 and an optical receiver 20 which are connected to each other by an optical communication path 30 such as an optical fiber. The optical transmitter 10 includes a carrier generation section 11, an M-ary intensity modulation section 12, a pseudo-random number generation section 13, a basis selection control section 14, and a transmission data generation section 15. The optical receiver 20 includes a photo diode 21, a threshold control section 22, a pseudo-random number generation section 23, and a basis selection control section 24. The pseudo-random number generation section 13 included in the optical transmitter 10 has a structure and a function substantially similar to those of the pseudo-random number generation section 23 included in the optical receiver 20. Further, the basis selection control section 14 included in the optical transmitter 10 has a structure and a function substantially similar to those of the basis selection control section 24 included in the optical receiver 20.

The carrier generation section 11 may include, for example, a laser diode, so as to output a predetermined optical carrier. The transmission data generation section 15 generates transmission data including logical values "1" and "0". The pseudo-random number generation section 13 generates a binary pseudo-random number sequence, i.e., a binary running key sequence, based on an initial key K to be received. The basis selection control section 14 divides the binary running key sequence into blocks by a unit of $\log_2 M$ bits, so as to convert the binary running key sequence into decimal running keys each of which corresponds to each of the blocks. Then, the basis selection control section 14 selects a basis from a basis group in accordance with each of the running keys, so as to indicate, to the M-ary intensity modulation section 12, the basis as basis information. The M-ary intensity modulation section 12 intensity-modulates the optical carrier by the transmission data, and simultaneously causes, by using intensities of the basis indicated as the basis information, the optical carrier to include information representing a logical value "1" or "0", so as to output the intensity-modulated optical carrier to the optical receiver 20 via the optical communication path 30.

The photo diode 21 receives the intensity-modulated optical signal outputted from the optical transmitter 10 via the optical communication path 30. The pseudo-random number generation section 23 generates a binary running key sequence, based on an initial key K to be received. The basis selection control section 24 divides the binary running key sequence into blocks by a unit of $\log_2 M$ bits, so as to convert the binary running key sequence into decimal running keys each of which corresponds to each of the blocks. Then, the basis selection control section 24 selects a basis from a basis group in accordance with each of the running keys, so as to indicate, to the threshold control section 22, the basis as basis information. Based on the basis information indicated by the basis selection control section 24, the threshold control section 22 controls which threshold is to be used so as to determine the received signal, and extracts the logical value "1" or "0" included in the signal so as to output the extracted logical value as reception data.

In the above-described conventional cryptographic communication device, the basis groups, i.e., basis positions, which are used in the basis selection control section 14 and the basis selection control section 24, respectively, are an important element for determining the strength of a cipher. With reference to FIG. 4, a conventional method for positioning bases will be described below.

First, a dynamic range of intensity modulation is set to range from a maximum intensity Smax to a minimum intensity Smin. A middle point intensity of the maximum intensity Smax and the minimum intensity Smin is set as [(Smax−Smin)/2]. Each of the bases includes a high intensity and a low intensity which are positioned in accordance with a rule that the high intensity is higher than the middle point intensity and the low intensity is lower than the middle point intensity. Further, the number M of the bases is determined such that a distance (an intensity difference) between adjacent signals (between an intensity $S_i$ and an intensity $S_{i+1}$) is buried within quantum fluctuations. For example, as shown in FIG. 4, signal intensities are arranged from the maximum intensity Smax to the minimum intensity Smin, in order of $S_1, S_2, \ldots, S_{M-1}, S_M, S_{M+1}, \ldots, S_{2M}$, so as to provide bases $\{S_1, S_{M+1}\}, \{S_2, S_{M+2}\}, \ldots$. Note that adjacent bases are set to have an intensity signal transmitting a logical value "1" of transmission data and an intensity signal transmitting a logical value "0" of transmission data in an inverted manner.

In the above-described conventional cryptographic communication device, the legitimate receiver is to identify signals having two values between which a distance is large, and therefore hardly causes any error. However, an eavesdropper, who does not know an initial key K, is restricted to a receiving method for identifying signals having 2M values between adjacent two of which the distance is small, and therefore, an error is caused in obtained reception data due to quantum fluctuations or quantum shot noise. Thus, the eavesdropper cannot obtain information about cryptogram per se.

In the above-described mechanism, which is a kind of random stream cipher, data is randomized by quantum fluctuations, and therefore, randomness of the data cannot be changed back to a certain value by calculations. Thus, for the above reasons, Y-00 protocol can realize a cipher having high security.

The cryptography using Yuen protocol includes conventional optical communication of which communication system has little quantum nature. However, as described above, the cryptography using Yuen protocol provides ultra security based on an invention in which an eavesdropper who does not know a key cannot obtain information due to quantum fluctuations.

Non-patent Document 1: C. H. Bennett and G. Brassard, "Quantum cryptography", in Proc. IEEE, Int. Conf. on Computers system, and signal processing, p. 175, 1984

Non-patent Document 2: G. A. Barbosa, E. Corndorf, P. Kumar, H. P. Yuen, "Secure communication using mesoscopic coherent state", Phys. Rev. Lett., vol-90, 227901, 2003

Non-patent Document 3: O. Hirota, K. Kato, M. Sohma, T. Usuda, K. Harasawa, "Quantum stream cipher based on optical communication", SPIE Proc. on Quantum Communications, vol-5551, 2004

DISCLOSURE OF THE INVENTION

Problems to be Solved by the Invention

However, in order to perform unbreakable cryptographic communication in the above-described cryptography system using Yuen protocol, energy of a transmission light and the number of the bases used for transmitting signals are required to be subjected to optimum designs, or a distance between signals of adjacent bases are required to be extremely small. Thus, a light source and a modulator are required to have extremely high accuracy.

Further, in conventional randomization for increasing security, a variety of the optimum designs are performed by, in principle, using a structure of the basis positions shown in FIG. 4 as it stands, and therefore, the modulator may still be required to have high accuracy in an extreme manner. Thus, electronic control having an even higher capability is required.

Furthermore, in the conventional optical intensity modulation method, the basis group is arranged so as to be symmetrical across the middle point intensity of the maximum intensity and the minimum intensity. As a result, intensities $S_M$ and $S_{M+1}$, which are adjacent to each other across the middle point intensity, each include only a logical value "1" (or only a logical value "0") of transmission data (dashed oval portions of FIG. 4), and therefore, a class can be created so as to include signals immediately above and below the middle point intensity. Thus, when an eavesdropper conducts an exhaustive key search on data observed immediately above and below the middle point intensity, there is a high probability that an error caused by an eavesdropper is sufficiently small. An attack as described above, which is referred to as an indirect measurement attack, does not essentially lead to deciphering. However, it cannot be denied that there is a possibility that the attack can lead to deciphering by accident when the error is small.

Therefore, objects of the present invention are to provide an optical transmitter and an optical transmitting method for transmitting cryptogram, which are capable of increasing security, even against an indirect measurement attack, without increasing an accuracy-related burden on a modulator.

Solution to the Problems

The present invention is directed at an optical transmitter and an optical transmitting method for transmitting cryptogram by an optical signal. To achieve the above objects, the present invention has the following aspects. The optical transmitter (and transmitting method) according to the present invention includes: a pseudo-random number generation section (step) for generating a pseudo-random number sequence from an initial key; a basis selection control section (step) for retaining a basis group including a plurality of bases and for selecting a basis from the basis group in accordance with the pseudo-random number sequence; and an optical intensity modulation section (step) for generating an optical signal modulated by an intensity which is based on the selected basis and on a logical value of transmission data, in which the plurality of bases included in the basis group are positioned such that at least two bases of the plurality of bases each have intensities adjacent to each other across a middle point of a maximum intensity and a minimum intensity, and that the intensities adjacent to each other include two logical values to be represented by the transmission data.

It is preferable that each of the plurality of bases included in the basis group has a high intensity and a low intensity between which a difference is set to be a certain value smaller than an intensity of the middle point of the maximum intensity and the minimum intensity. Alternatively, it is preferable that the plurality of bases included in the basis group are positioned such that at least two bases of the plurality of bases have a same low intensity and at least two bases of the plurality of bases have a same high intensity.

Note that it is possible to construct an optical cryptographic transmission system including: the optical transmitter; an optical receiver for extracting logical values of transmission data by using a plurality of bases positioned such that at least two bases of the plurality of bases each have intensities adjacent to each other across a middle point of a maximum intensity and a minimum intensity, and that the intensities adjacent to each other include two logical values to be represented by the transmission data; and an optical transmission path for connecting the optical transmitter to the optical receiver.

Effect of the Invention

According to the present invention, a cipher can be resistant to a direct measurement attack for directly obtaining data and also to an indirect measurement attack dependent on a contingency, both of which are conducted by an eavesdropper. Therefore, in an optical intensity modulation method, a cipher which is highly resistant to a known plaintext attack for deciphering can be realized without improving control accuracy of modulation signals in an extreme manner. Further, the existing communications infrastructure can be used, and therefore, absolute security of cryptographic communication can be provided at low cost.

BRIEF DESCRIPTION OF THE DRAWINGS

FIG. 3 is a diagram illustrating a structure of a conventional cryptographic communication device.

Figure 1:
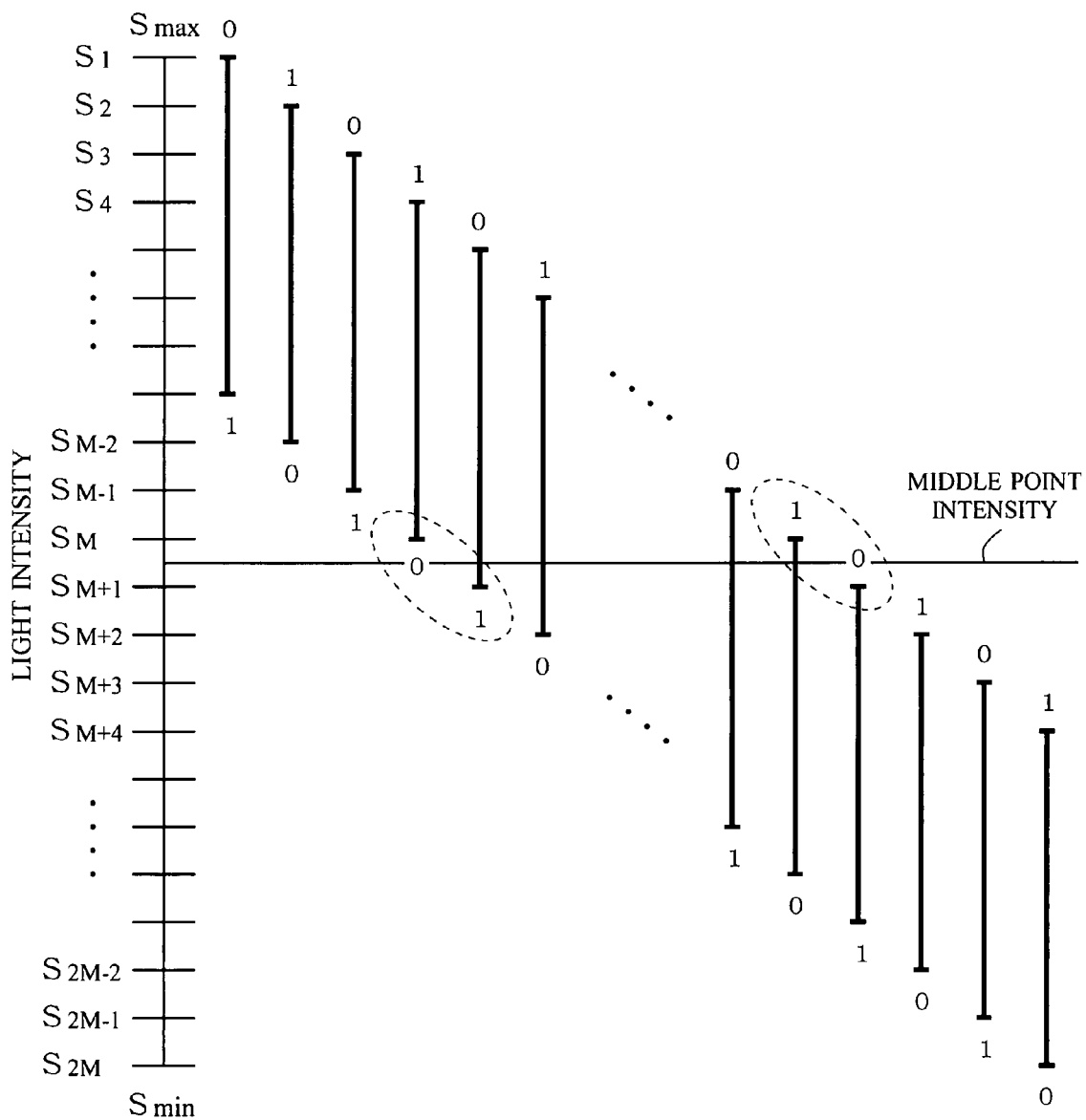
FIG. 1 is a schematic diagram illustrating basis positions of an optical intensity modulation method performed in an optical transmitter for transmitting cryptogram, according to a first embodiment of the present invention.

DESCRIPTION OF THE REFERENCE CHARACTERS 10 optical transmitter
11 carrier generation section
12 M-ary intensity modulation section
13, 23 pseudo-random number generation section
14, 24 basis selection control section
15 transmission data generation section
20 optical receiver
21 photo diode
22 threshold control section
30 optical communication path

BEST MODE FOR CARRYING OUT THE INVENTION

An optical transmitter for transmitting cryptogram, according to the present invention, has a structure basically similar to that of the optical transmitter 10 shown in FIG. 3. Features of the present invention are that unique basis positions are used in a basis selection control section 14 included in this structure.

Hereinafter, the basis positions, which are the features of the present invention, will be described with reference to the drawings.

First Embodiment

FIG. 1 is a schematic diagram illustrating basis positions of an optical intensity modulation method performed in an optical transmitter for transmitting cryptogram, according to a first embodiment of the present invention. In the first embodiment of the present invention, bases are positioned as described below.

First, a dynamic range of intensity modulation is set to range from a maximum intensity Smax to a minimum intensity Smin. A difference $\Delta(=\text{Smax}-\text{Smin})$ between the maximum intensity Smax and the minimum intensity Smin is divided by the number 2M of multilevel signals. Thus, a distance (an intensity difference) between adjacent signals (between an intensity $S_i$ and an intensity $S_{i+1}$) is $[\Delta/2M]$. The number 2M of multilevel signals is selected such that the distance $[\Delta/2M]$ is sufficiently buried within a range of quantum fluctuations obtained when heterodyne measurements are made or buried within a range of quantum shot noise obtained when a direct detection is made. Then, each of the bases of a basis group is positioned for intensity signals so as to have a high intensity and a low intensity between which a distance is set to be a certain value smaller than a middle point intensity $[\Delta/2]$. FIG. 1 shows the bases positioned in a case where the certain value is $[\Delta/2M\times(M-4)]$. Note that, as is conventionally done, adjacent bases are set to have an intensity signal transmitting a logical value "1" of transmission data and an intensity signal transmitting a logical value "0" of transmission data in an inverted manner.

When the bases are positioned in accordance with the above-described conditions, there is a possibility that an intensity $S_M$ and an intensity $S_{M+1}$, which are adjacent to each other across the middle point intensity $[\Delta/2]$, each include both logical values "1" and "0" of transmission data (dashed oval portions of FIG. 1). Since running keys from a pseudo-random number generation section 13 are uniformly distributed, a probability of selecting prepared bases is also uniformly distributed. Therefore, when an eavesdropper, who does not know an initial key K, creates classes, for reception data, each of which ranges between several arbitrary intensities, errors (errors due to quantum fluctuations of a light per se) in data caused by the eavesdropper may be uniformly and effectively distributed in proportion to the number of the classes. Thus, the class roughly created so as to be immediately above and below the middle point intensity $[\Delta/2]$ may be pointless.

As described above, according to the optical transmitter and the basis position method for transmitting cryptogram, based on the first embodiment of the present invention, a cipher can be resistant to a direct measurement attack for directly obtaining data and also to an indirect measurement attack dependent on a contingency, both of which are conducted by an eavesdropper. Therefore, in an optical intensity modulation method, a cipher which is highly resistant to a known plaintext attack for deciphering can be realized without improving control accuracy of modulation signals in an extreme manner. Further, the existing communications infrastructure can be used, and therefore, absolute security of cryptographic communication can be provided at low cost.

Second Embodiment

Figure 2:
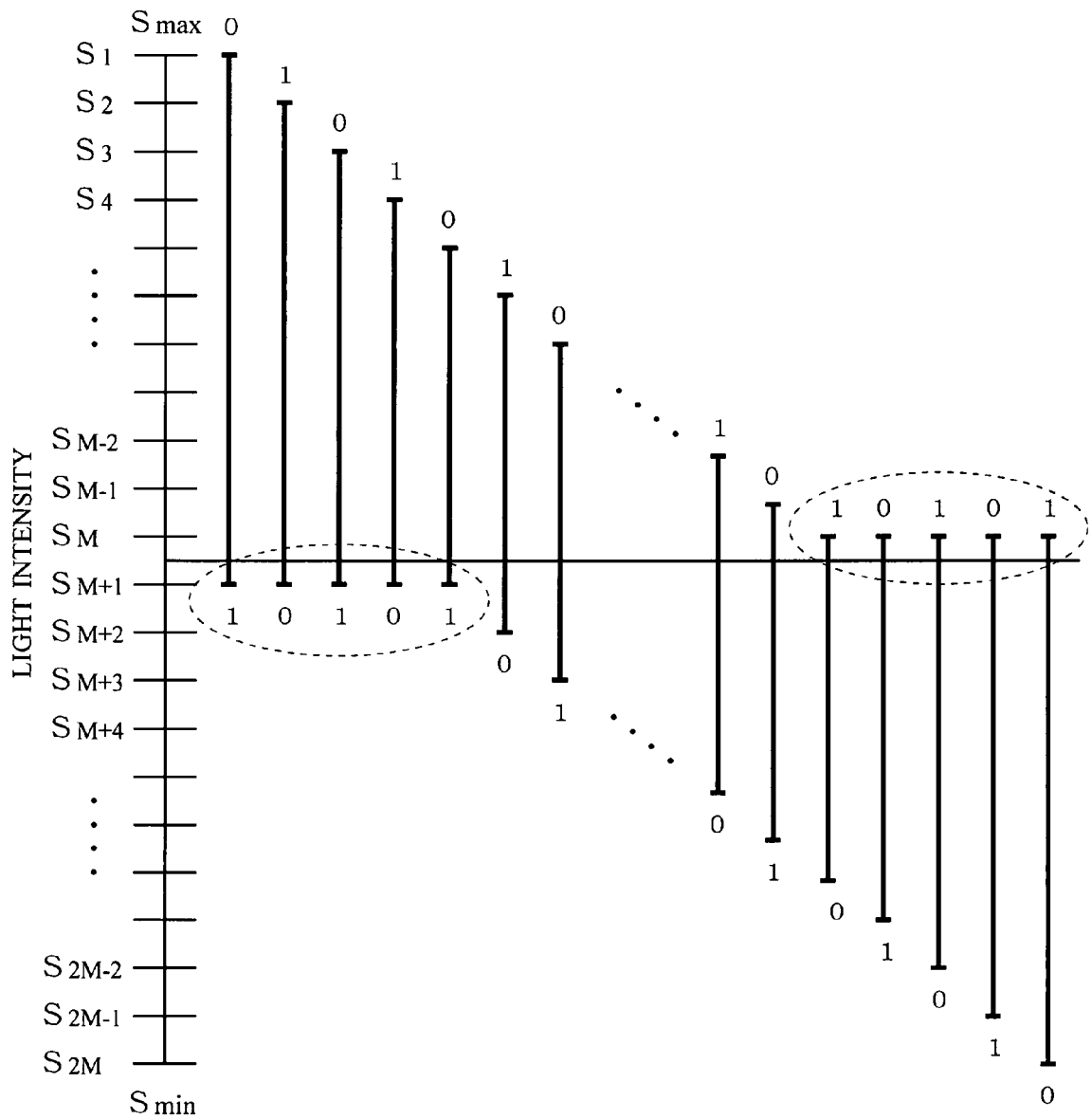
FIG. 2 is a schematic diagram illustrating basis positions of an optical intensity modulation method performed in an optical transmitter for transmitting cryptogram, according to a second embodiment of the present invention.
Figure 4:
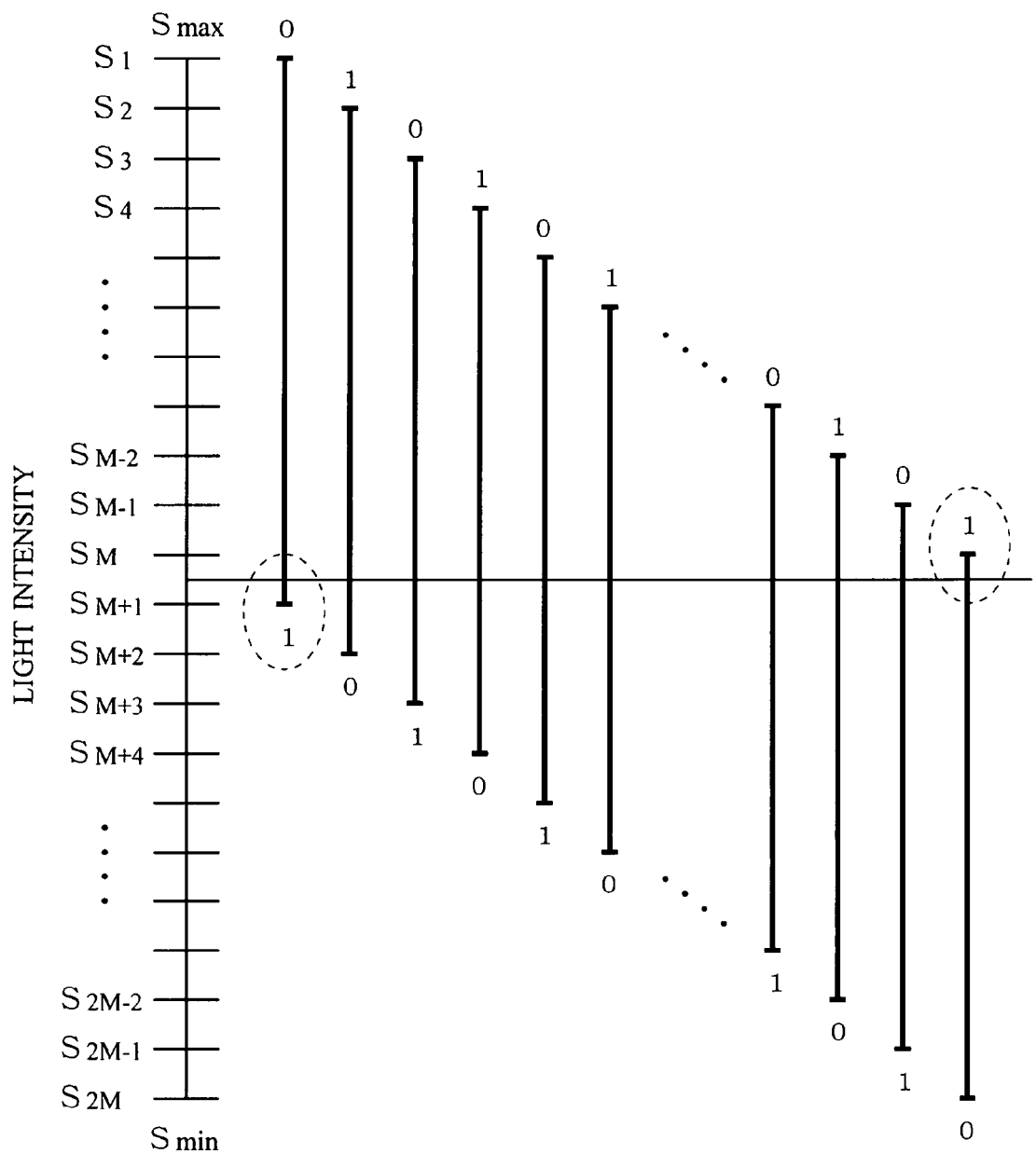
FIG. 4 is a schematic diagram illustrating basis positions of an optical intensity modulation method performed in the conventional cryptographic communication device.

FIG. 2 is a schematic diagram illustrating basis positions of an optical intensity modulation method performed in an optical transmitter for transmitting cryptogram, according to a second embodiment of the present invention. In the second embodiment of the present invention, bases are positioned as described below.

First, a maximum intensity Smax and a minimum intensity Smin for determining a dynamic range of intensity modulation are set. A difference Δ(=Smax−Smin) between the maximum intensity Smax and the minimum intensity Smin is divided by the number 2M of multilevel signals. Thus, a distance (an intensity difference) between adjacent signals (between an intensity $S_i$ and an intensity $S_{i+1}$) is [Δ/2M]. The number 2M of multilevel signals is selected such that the distance [Δ/2M] is sufficiently buried within a range of quantum fluctuations obtained when heterodyne measurements are made or buried within a range of quantum shot noise obtained when a direct detection is made. Then, each of the bases of a basis group is positioned for intensity signals so as to have a high intensity and a low intensity between which a distance is set to be a value smaller than a middle point intensity [Δ/2]. In this case, up to N (N<M) bases in descending order by high intensity each have the low intensity set as an intensity $S_{M+1}$ slightly smaller than the middle point intensity, while up to N bases in ascending order by low intensity each have the high intensity set as an intensity $S_M$ slightly larger than the middle point intensity. Differences between the high intensities and the low intensities of other bases may be certain values. FIG. 2 shows the bases positioned in a case where N=5. Note that, as is conventionally done, adjacent bases are set to have an intensity signal transmitting a logical value "1" of transmission data and an intensity signal transmitting a logical value "0" of transmission data in an inverted manner.

When the bases are positioned in accordance with the above-described conditions, there is a possibility that the intensity $S_M$ and the intensity $S_{M+1}$, which are adjacent to each other across the middle point intensity [Δ/2], each include both logical values "1" and "0" of transmission data in an overlapping manner (dashed oval portions of FIG. 2). Since running keys from a pseudo-random number generation section 13 are uniformly distributed, a probability of selecting prepared bases is also uniformly distributed. In this case, an eavesdropper is required to identify all of signal intensities in order to directly detect transmission information, and therefore cannot determine half of the transmission information by using the class created so as to be immediately above and below the middle point intensity [Δ/2]. The legitimate receiver, who knows which of the bases is used, can certainly determine all of the transmission information.

As described above, according to the optical transmitter and the basis position method for transmitting cryptogram, based on the second embodiment of the present invention, a cipher can be resistant to a direct measurement attack for directly obtaining data and also to an indirect measurement attack dependent on a contingency, both of which are conducted by an eavesdropper. Therefore, in an optical intensity modulation method, a cipher which is highly resistant to a known plaintext attack for deciphering can be realized without improving control accuracy of modulation signals in an extreme manner. Further, the existing communications infrastructure can be used, and therefore, absolute security of cryptographic communication can be provided at low cost.

Note that in each of the above first and second embodiments, an optical transmitter for transmitting an optical signal is described. However, each of the above first and second embodiments is applicable to a transmitter for transmitting an electrical signal when using a noise source and the like generating noise equivalent to quantum noise components generated in the optical communication path 30.

INDUSTRIAL APPLICABILITY

The present invention is applicable to an optical transmitter and the like for transmitting cryptogram, and particularly is suitable for a case where cryptographic communication is required to be resistant to both a direct measurement attack and an indirect measurement attack in order to increase its absolute security.

The invention claimed is:

1. An optical transmitter for transmitting cryptogram by an optical signal, the optical transmitter comprising:
    a central processing unit configured to operate as:
        a pseudo-random number generation section for generating a pseudo-random number sequence from an initial key;
        a basis selection control section for retaining a basis group including a plurality of bases and for selecting a basis from the basis group in accordance with the pseudo-random number sequence; and
        an optical intensity modulation section for generating an optical signal modulated by an intensity which is based on the selected basis and on a logical value of transmission data, wherein
        the plurality of bases included in the basis group are positioned such that at least two bases of the plurality of bases each have intensities adjacent to each other across a middle point of a maximum intensity and a minimum intensity, that the intensities adjacent to each other include two logical values to be represented by the transmission data, and that each of the plurality of bases included in the basis group has a high intensity and a low intensity between which a difference is set to be a certain value smaller than half a difference value of the maximum intensity and the minimum intensity.

2. An optical transmitter for transmitting cryptogram by an optical signal, the optical transmitter comprising:
    a central processing unit configured to operate as:
        a pseudo-random number generation section for generating a pseudo-random number sequence from an initial key;
        a basis selection control section for retaining a basis group including a plurality of bases and for selecting a basis from the basis group in accordance with the pseudo-random number sequence; and
        an optical intensity modulation section for generating an optical signal modulated by an intensity which is based on the selected basis and on a logical value of transmission data, wherein
        the plurality of bases included in the basis group are positioned such that at least two bases of the plurality of bases each have intensities adjacent to each other across a middle point of a maximum intensity and a minimum intensity, that the intensities adjacent to each other include two logical values to be represented by the transmission data, and that at least two bases of the plurality of bases have a same low intensity and at least two bases of the plurality of bases have a same high intensity.

3. An optical transmitting method for transmitting cryptogram by an optical signal, the optical transmitting method comprising:
    a step of generating a pseudo-random number sequence from an initial key;

a step of selecting, in accordance with the pseudo-random number sequence, a basis from a basis group including a plurality of bases; and a step of generating an optical signal modulated by an intensity which is based on the selected basis and on a logical value of transmission data, wherein the plurality of bases included in the basis group are positioned such that at least two bases of the plurality of bases each have intensities adjacent to each other across a middle point of a maximum intensity and a minimum intensity, that the intensities adjacent to each other include two logical values to be represented by the transmission data, and that each of the plurality of bases included in the basis group has a high intensity and a low intensity between which a difference is set to be a certain value smaller than half a difference value of the maximum intensity and the minimum intensity.

4. An optical transmitting method for transmitting cryptogram by an optical signal, the optical transmitting method comprising:

a step of generating a pseudo-random number sequence from an initial key;

a step of selecting, in accordance with the pseudo-random number sequence, a basis from a basis group including a plurality of bases; and a step of generating an optical signal modulated by an intensity which is based on the selected basis and on a logical value of transmission data, wherein the plurality of bases included in the basis group are positioned such that at least two bases of the plurality of bases each have intensities adjacent to each other across a middle point of a maximum intensity and a minimum intensity, that the intensities adjacent to each other include two logical values to be represented by the transmission data, and that at least two bases of the plurality of bases have a same low intensity and at least two bases of the plurality of bases have a same high intensity.

5. An optical receiver for receiving the optical signal outputted from the optical transmitter according to claim 1, the optical receiver comprising:

a central processing unit configured to operate as:

a pseudo-random number generation section for generating a pseudo-random number sequence from an initial key;

a basis selection control section for retaining a basis group including a plurality of bases and for selecting a basis from the basis group in accordance with the pseudo-random number sequence; and a data extraction section for reproducing, from the received optical signal, the logical values of the transmission data by using the selected basis, wherein the plurality of bases included in the basis group are positioned such that at least two bases of the plurality of bases each have intensities adjacent to each other across a middle point of a maximum intensity and a minimum intensity, that the intensities adjacent to each other include two logical values to be represented by the transmission data, and that each of the plurality of bases included in the basis group has a high intensity and a low intensity between which a difference is set to be a certain value smaller than half a difference value of the maximum intensity and the minimum intensity.

6. An optical receiver for receiving the optical signal outputted from the optical transmitter according to claim 2, the optical receiver comprising:

a central processing unit configured to operate as:

a pseudo-random number generation section for generating a pseudo-random number sequence from an initial key;

a basis selection control section for retaining a basis group including a plurality of bases and for selecting a basis from the basis group in accordance with the pseudo-random number sequence; and a data extraction section for reproducing, from the received optical signal, the logical values of the transmission data by using the selected basis, wherein the plurality of bases included in the basis group are positioned such that at least two bases of the plurality of bases each have intensities adjacent to each other across a middle point of a maximum intensity and a minimum intensity, that the intensities adjacent to each other include two logical values to be represented by the transmission data, and that at least two bases of the plurality of bases have a same low intensity and at least two bases of the plurality of bases have a same high intensity.

* * * * *

UNITED STATES PATENT AND TRADEMARK OFFICE
CERTIFICATE OF CORRECTION

PATENT NO. : 7,869,600 B2
APPLICATION NO. : 11/886256
DATED : January 11, 2011
INVENTOR(S) : Masaru Fuse et al.

It is certified that error appears in the above-identified patent and that said Letters Patent is hereby corrected as shown below:

On the Title Page

In Section (73) Assignee, please change "Panasonic Corporation, Osaka (JP)" to --Panasonic Corporation, Osaka (JP), Osamu Hirota, Kanagawa (JP), and Masaki Souma, Tokyo (JP)--.

Signed and Sealed this
Twenty-first Day of June, 2011

David J. Kappos
*Director of the United States Patent and Trademark Office*